United States Patent
Yamamoto

(10) Patent No.: US 7,131,126 B2
(45) Date of Patent: Oct. 31, 2006

(54) NETWORK SYSTEMS, SERVERS, CLIENTS, COMMUNICATION METHODS BETWEEN OBJECTS, PROFILE OBJECT REGISTRATION METHODS, PROGRAMS, AND STORAGE MEDIA

(75) Inventor: Hiroshi Yamamoto, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 10/159,305

(22) Filed: May 30, 2002

(65) Prior Publication Data

US 2002/0194391 A1    Dec. 19, 2002

(30) Foreign Application Priority Data

Jun. 14, 2001    (JP) ............................ 2001-180191

(51) Int. Cl.
*G06F 9/00* (2006.01)

(52) U.S. Cl. ...................................... 719/316; 719/310

(58) Field of Classification Search ................ 719/316, 719/332, 310, 315; 707/103 Y, 103 X, 103 Z, 707/200, 204; 709/200, 201, 217
See application file for complete search history.

(56) References Cited

U.S. PATENT DOCUMENTS

| | | | | |
|---|---|---|---|---|
| 6,016,516 | A | 1/2000 | Horikiri | 709/304 |
| 6,266,406 | B1 * | 7/2001 | Mercouroff et al. | 379/230 |
| 6,453,320 | B1 | 9/2002 | Kukura et al. | 707/103 |
| 6,516,354 | B1 * | 2/2003 | Cavanaugh | 719/316 |
| 6,567,818 | B1 * | 5/2003 | Frey et al. | 707/103 R |
| 6,574,675 | B1 * | 6/2003 | Swenson | 719/316 |
| 6,578,050 | B1 * | 6/2003 | Daggubati et al. | 707/104.1 |
| 6,629,112 | B1 * | 9/2003 | Shank et al. | 707/206 |
| 6,629,128 | B1 * | 9/2003 | Glass | 709/203 |
| 6,735,771 | B1 * | 5/2004 | Houlding | 719/315 |
| 6,751,646 | B1 * | 6/2004 | Chow et al. | 718/105 |
| 6,766,335 | B1 * | 7/2004 | Kukura et al. | 707/204 |
| 6,839,748 | B1 * | 1/2005 | Allavarpu et al. | 709/223 |

FOREIGN PATENT DOCUMENTS

| | | |
|---|---|---|
| JP | 07-085122 | 3/1995 |
| JP | 10-049392 | 2/1998 |
| JP | 10187637 A2 | 7/1998 |
| JP | 10-214189 | 8/1998 |

(Continued)

OTHER PUBLICATIONS

Vinoski, Steve, "Corba: Integrating Diverse Applications Within Distributed Heterogeneous Environments," IEEE, Feb. 1997, pp. 46-55.

(Continued)

*Primary Examiner*—William Thomson
*Assistant Examiner*—Andy Ho
(74) *Attorney, Agent, or Firm*—Sawyer Law Group LLP

(57) ABSTRACT

A network system built in a distributed system environment includes a server having a first ORB, a client having a second ORB, specifications for which are different from those for the first ORB, and a naming server which registers a profile object to disclose specifications for the first ORB through a naming service of the naming server. The second ORB in the client accesses the profile object through the naming server, grasps the specifications for the first ORB, and performs IIOP intercommunications according to the grasped specifications. The network system improves reliability and communication efficiency in intercommunication between ORBs with different specifications.

27 Claims, 9 Drawing Sheets

FOREIGN PATENT DOCUMENTS

| | | |
|---|---|---|
| JP | 10-320206 | 12/1998 |
| JP | 11-232104 | 8/1999 |
| JP | 2000-148698 | 5/2000 |
| JP | 2000224262 A2 | 8/2000 |
| JP | 2000-322288 | 11/2000 |
| JP | 2001-134540 | 5/2001 |
| JP | 2001-159978 | 6/2001 |
| WO | WO 98/44414 | 10/1998 |

OTHER PUBLICATIONS

Vinoski, Steve, "CORBA: Integrating Diverse Applications Within Distributed Heterogeneous Environments," IEEE, Feb. 1997, pp. 46-55.

* cited by examiner

[Figure 1]
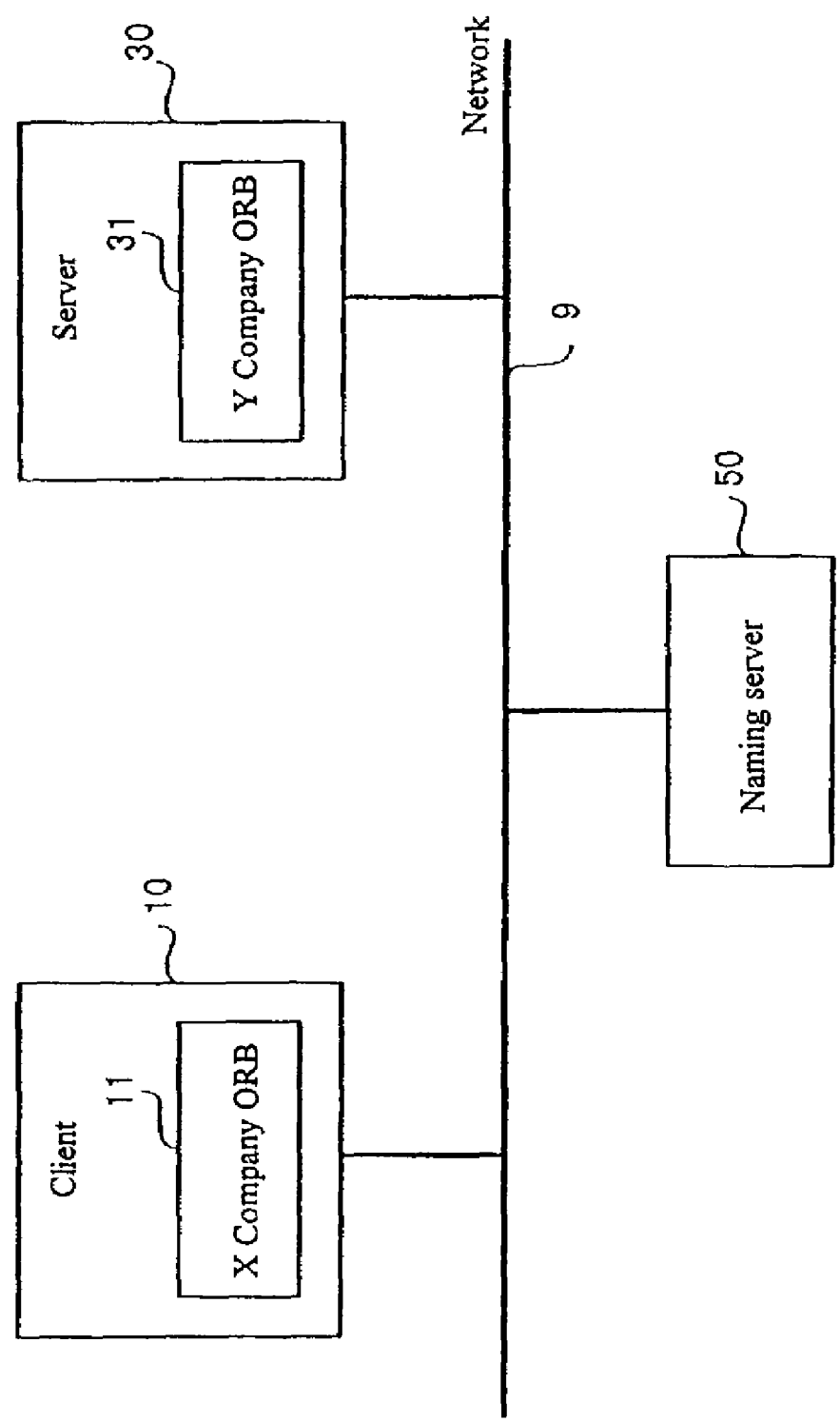

[Figure 2]
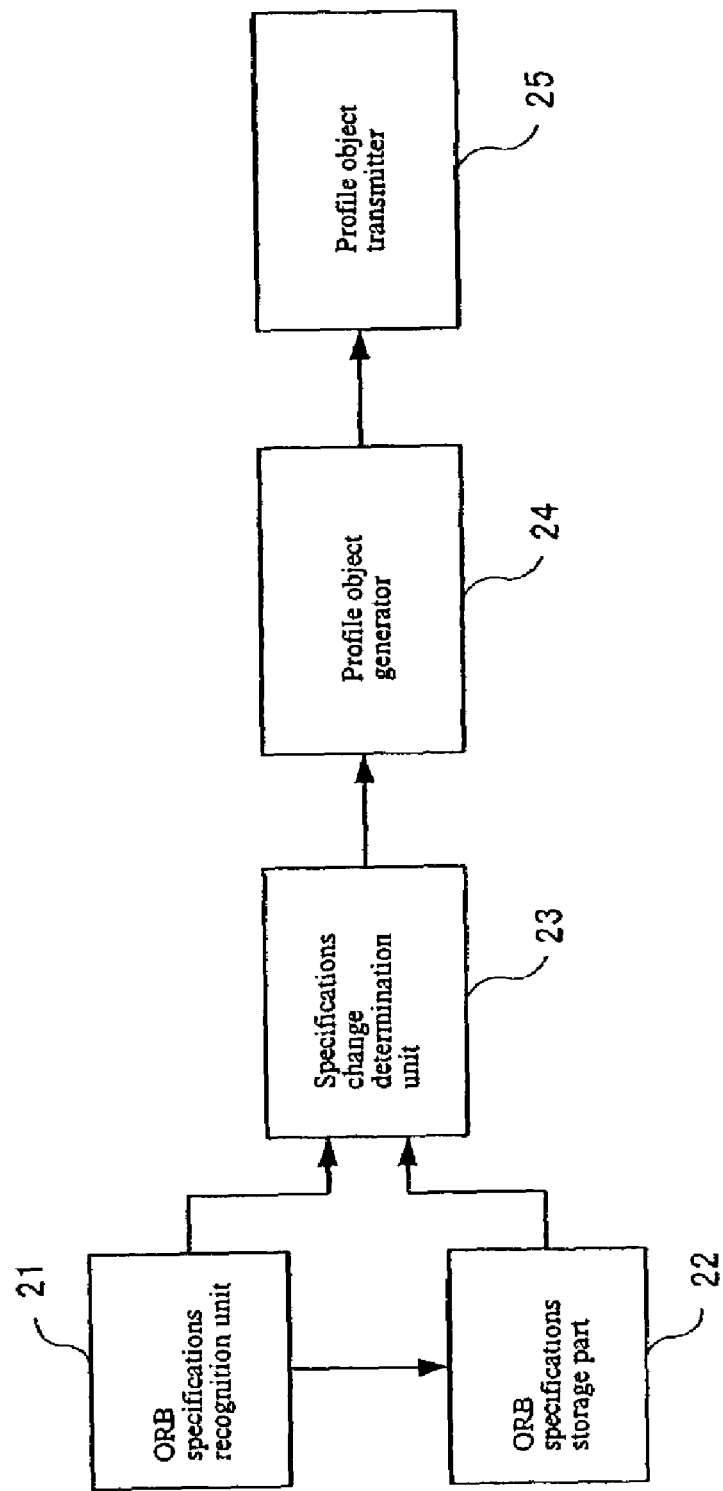

[Figure 3]
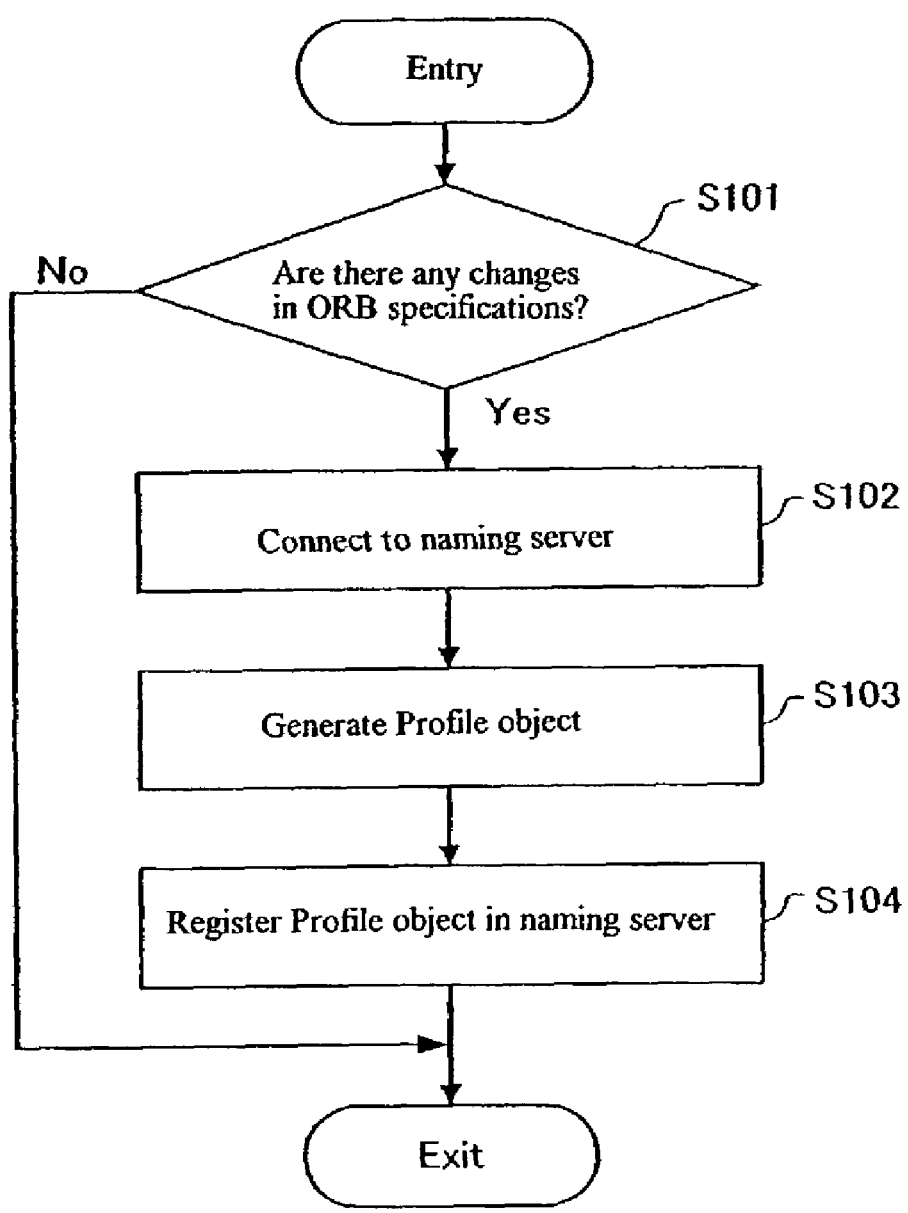

[Figure 4]
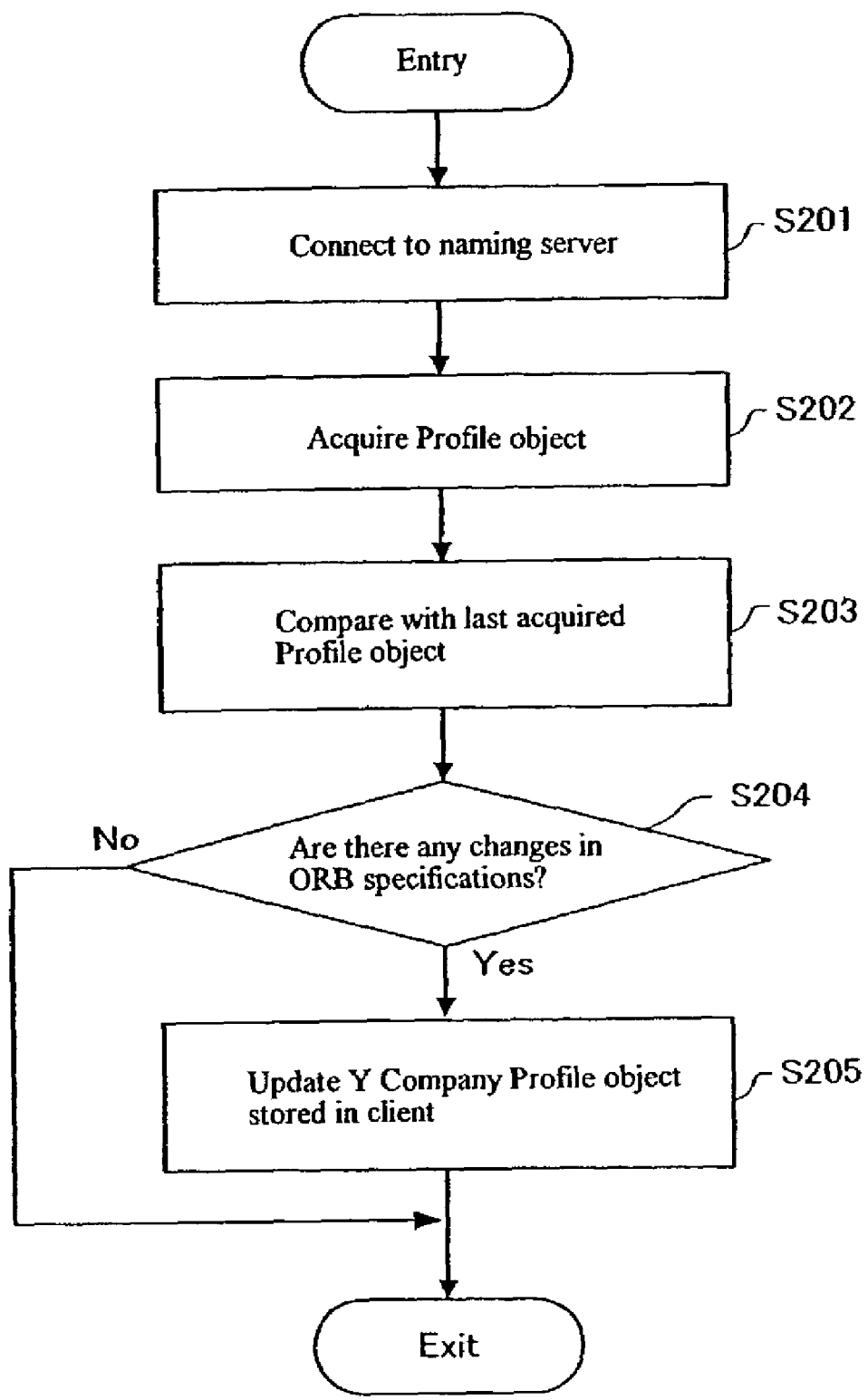

[Figure 5]
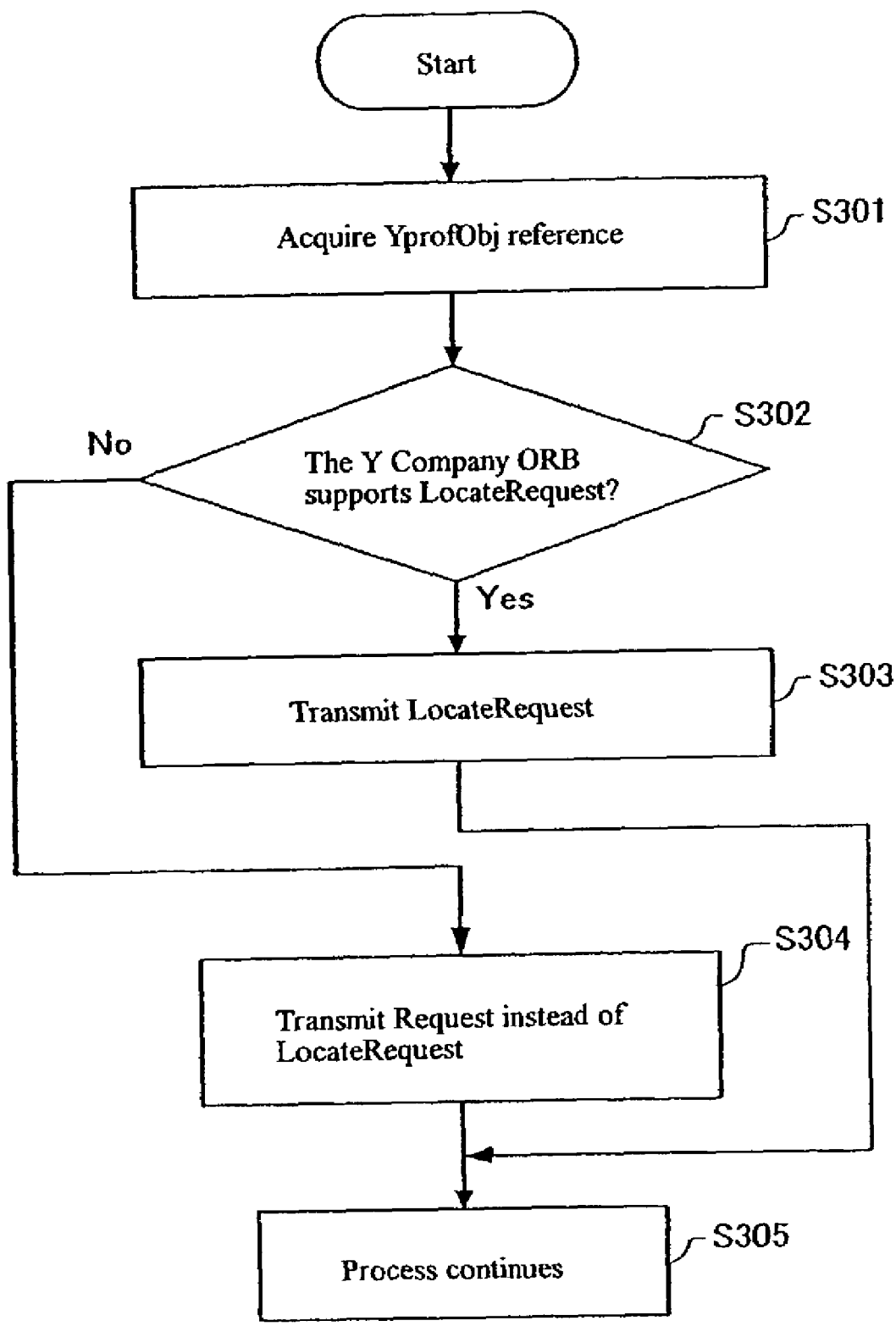

[Figure 6]
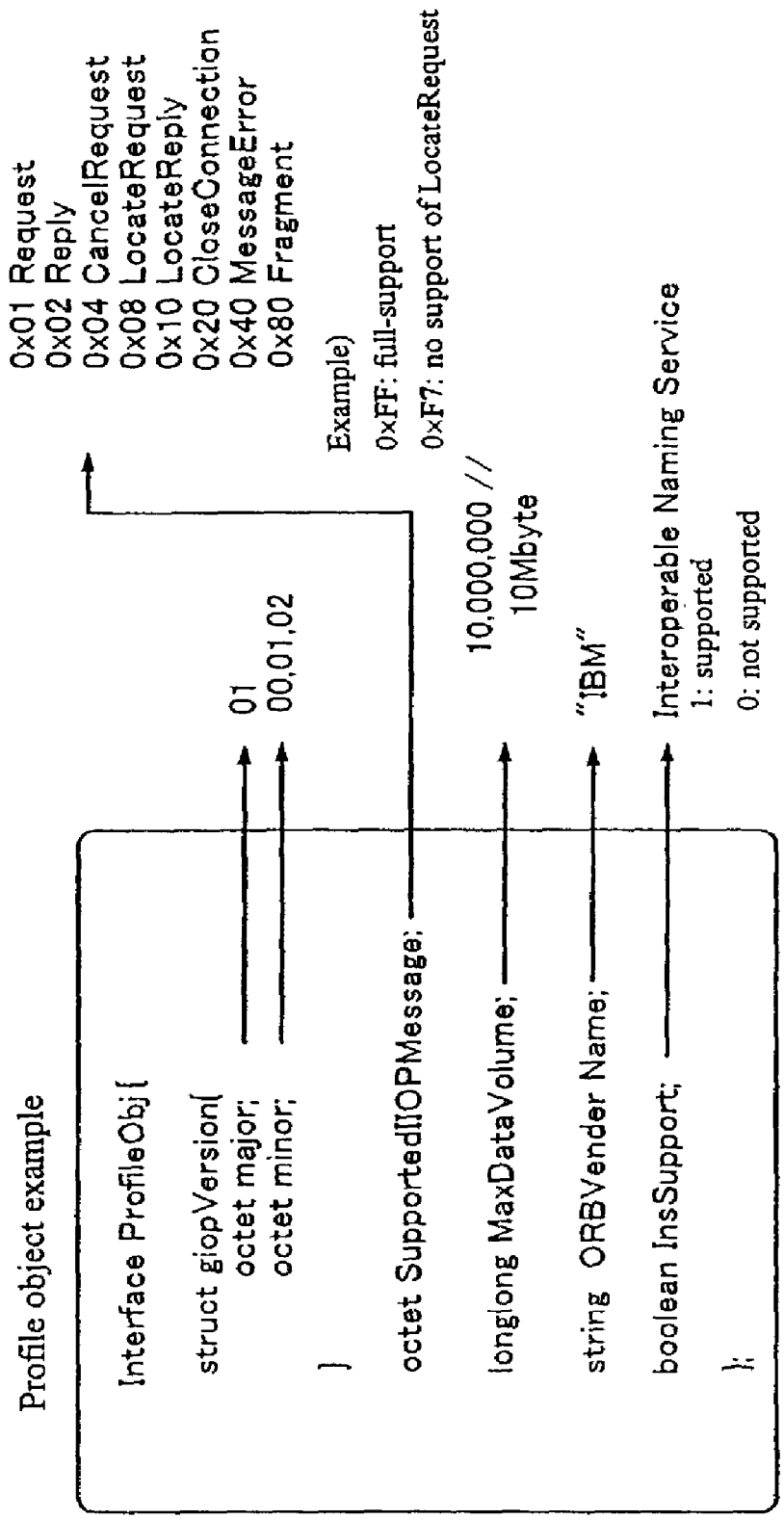

[Figure 7]

Profile object example

```
struct ObjectServiceContext{
        boolean  is_TransactionService
        boolean  is_CodeSet
        boolean  is_ChainBypassCheck
        boolean  is_ChainBypassInfo
        boolean  is_BI_DIR_IIOP
        boolean  is_INVOCATION_POLICIES
        boolean  is_SendingContextRuntime
        boolean  is_INVOCATION_POLICIES
        boolean  is_FORWARD_IDENTITY
        boolean  is_UnknownExceptionInfo

}
```

[Figure 8]
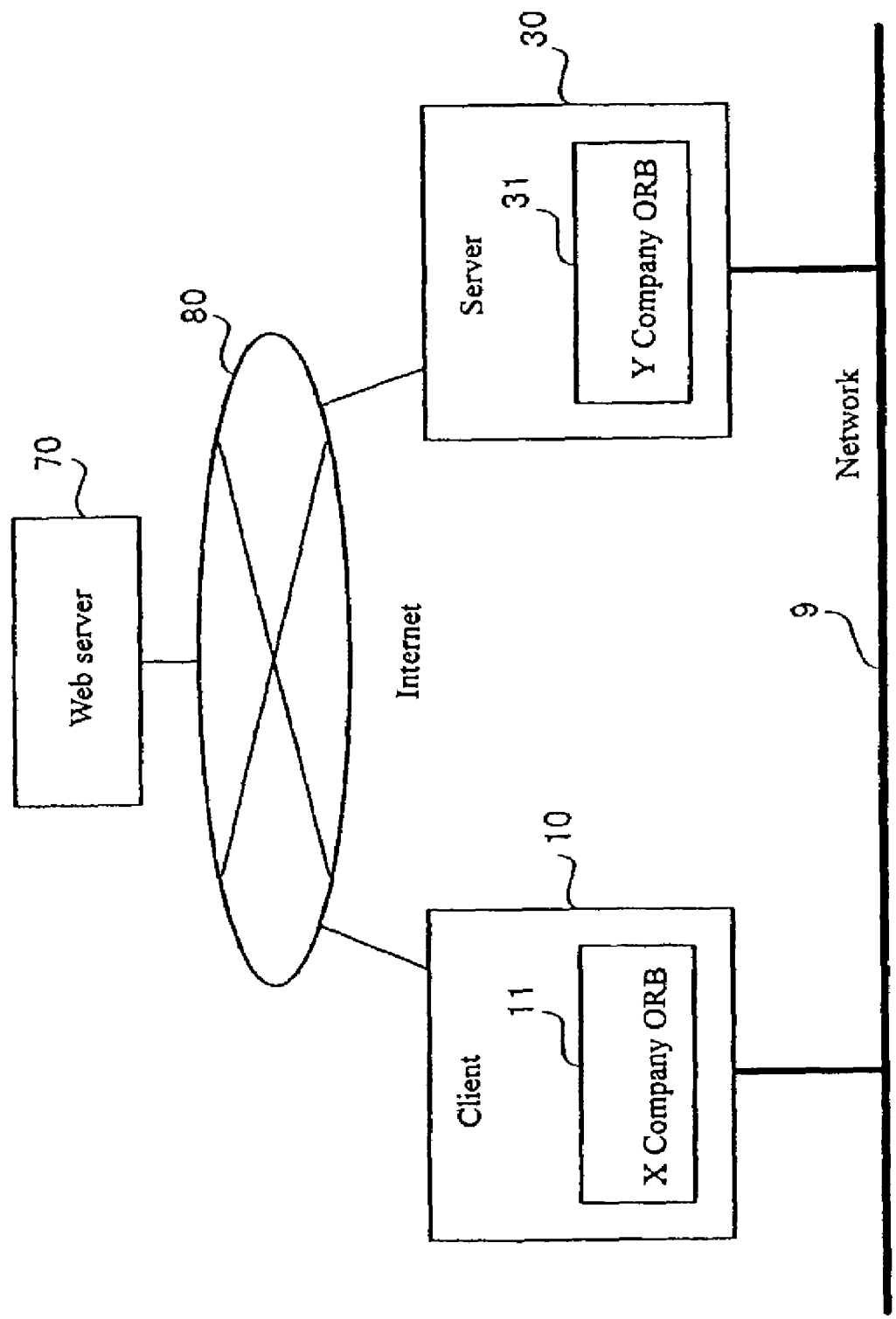

[Figure 9]
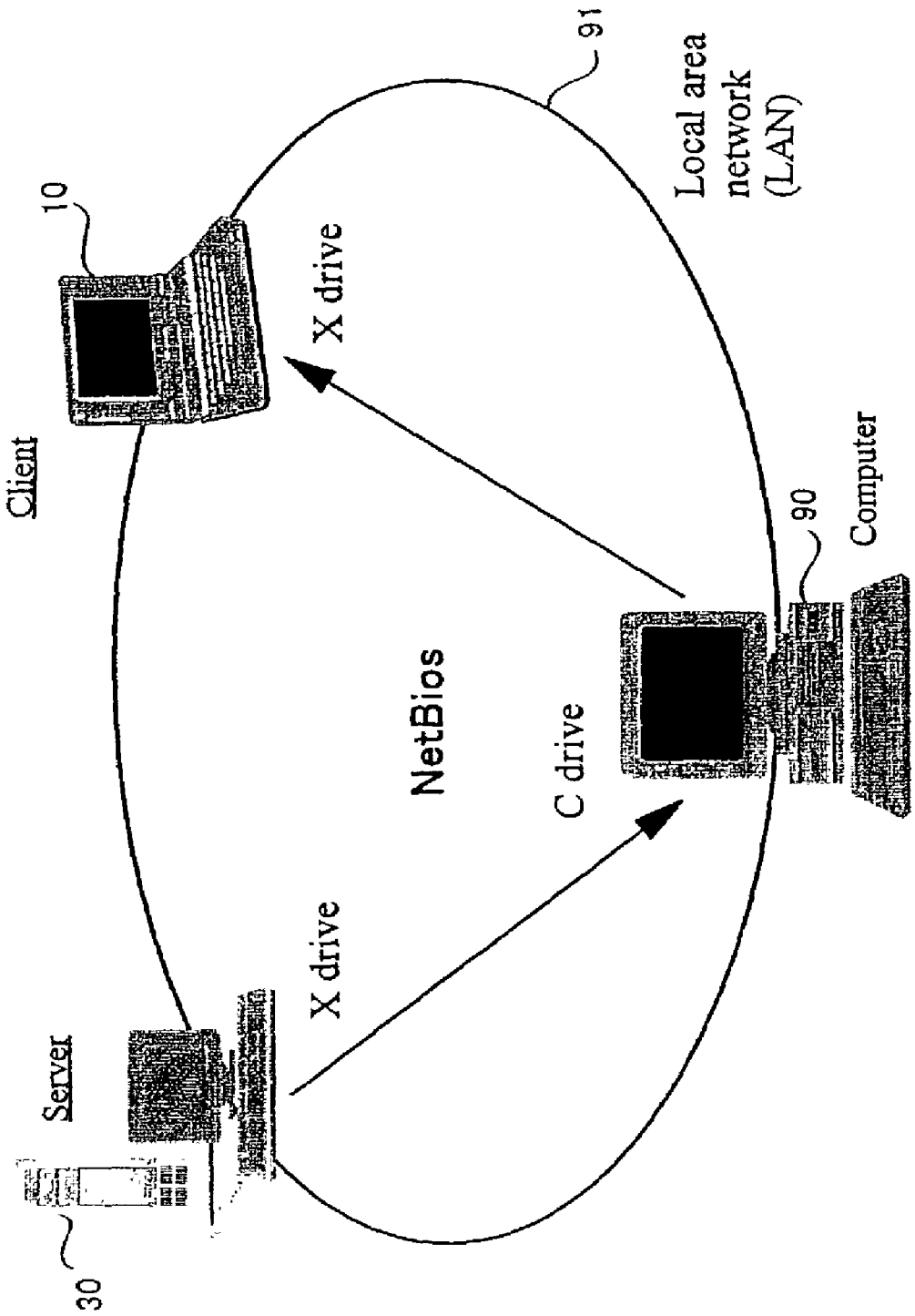

NETWORK SYSTEMS, SERVERS, CLIENTS, COMMUNICATION METHODS BETWEEN OBJECTS, PROFILE OBJECT REGISTRATION METHODS, PROGRAMS, AND STORAGE MEDIA

CROSS-REFERENCE TO RELATED APPLICATION

This application is claiming priority under 35 USC §119 foreign application no. 2001-180191, filed Jun. 14, 2001.

FIELD OF THE INVENTION

This invention relates to a network system built in a distributed system environment and, more particularly, to a network system enabling different types or versions of products to be efficiently interconnected.

BACKGROUND OF THE INVENTION

Recently, with rapid proliferation of network technology, distributed systems based on it have been increasingly employed and supplied by more and more vendors. Companies, which build information systems and utilize various data in electronic form to realize efficient operations, have been increased. However, in many cases, they employ independent systems dedicated to particular operations. Therefore, in promoting efficient operations among several sections of a company or cooperative work with other companies, various problems arise, including data sharing among companies, interconnection of systems, and policy for system replacement of each company. To address these problems, distributed object-oriented technology draws attention. This distributed object-oriented technology provides a mechanism, through which objects or function units are managed and executed in a distributed system.

The United States Object Management Group, an organization for standardization of object-oriented technology has a major purpose to interconnect distributed object products provided by different suppliers (vendors), and has established a specification, Common Object Request Broker Architecture (CORBA). The CORBA provides a framework for clients to call objects (distributed objects) residing in a network. In CORBA, common specifications for Object Request Broker (ORB), which is middle-ware to mediate communications between server objects and client applications on various machines in a distributed object environment, are provided.

Patent specifications related to the CORBA include Published Unexamined Patent Application No. 2000-224262 and No. 10-187637. The Application No. 2000-224262 describes a technique for flexibly accommodating various types of management objects and protocols in each device constituting a communication network to be managed. The technique includes an object that manages several objects in the same ORB named as an information management object (IMO) and a plurality of CORBA objects (application objects) systematically managed by the IMO.

In view of CORBA architecture, a plurality of CORBA naming services defined as a CORBA service can independently exist. Therefore, a client, who wants to access a desired CORBA object, does not know which naming service is to be accessed. Published Unexamined Patent Application No. 10-187637 discloses a technique for making each component of the naming services distributed and making it appear fictionally as a naming service if several naming services are available to provide a more flexible naming service.

Conventionally, vendors providing CORBA products interpret CORBA specifications by themselves and make implementations based on their interpretation and deliver their products as CORBA products in accordance with CORBA specifications. However, if a test is made for connection between CORBA products developed in accordance with CORBA specifications, it may fail because of different interpretations of CORBA specifications by different vendors, incomplete runtime module implementation for CORBA-IIOP (Internet Inter-ORB Protocol) communications in ORB, or ORB implementation that's unique to each vendor.

Also, since programs may be changed for each upgrade or modification of products after a successful connection, tests for interconnection between products would be required again. Furthermore, even if a server ORB supports excellent functions, dynamic recognition by clients is not provided in the conventional CORBA-IIOP communications environment, such that communication capabilities of the entire system may not be optimized.

In addition, the above Published Unexamined Patent Applications No. 2000-224262 and No. 1998-187637 do not disclose any techniques for facilitating communications between different types or versions of ORBs, and do not present a solution for the problems mentioned above.

The present invention solves the technical problems described above. It is therefore an object of the present invention to improve reliability and communication efficiency in interconnection in communications between ORBs of products having different specifications.

SUMMARY OF THE INVENTION

To achieve such an object, according to the present invention, a profile object, which indicates functions supported by an ORB performing CORBA-IIOP communications, is defined, implemented, and disclosed as a CORBA object, allowing vendors to interpret functions of a partner ORB to be connected through the profile object and achieve reliable CORBA-IIOP communications (Interoperability) suitable for the ORB functions.

Therefore, this invention provides a network system, which includes a first device comprising a first ORB and a second device provided by a different vendor and comprising a second ORB. The system comprises a generation unit for generating a profile object to disclose implementation specifications for the first ORB and a registration unit for registering the generated profile object. The second ORB acquires the profile object by accessing the registration unit and then recognizes the implementation specifications for the first ORB to communicate with the first ORB according to the implementation specifications for the first ORB.

As for the registration unit, the profile object can be registered in a naming server, which provides CORBA naming services, or a Web server. Furthermore, a remote shared disk is also available for registration.

In another aspect, this invention provides a network system built in a distributed system environment including a server comprising a first ORB, a client comprising a second ORB, specifications for which are different from those for the first ORB, and a naming sever which registers the profile object to disclose the specifications for the first ORB of the server through a naming service and provides the profile object. The second ORB accesses the profile object through the naming server and grasps the specifications for the first ORB.

Examples of definitions in a profile object include a method of describing a maximum data length of variable length parameters that can be handled by the first ORB, and also a method of disclosing CORBA-IIOP communication messages supported by the first ORB. The second ORB acquiring such a profile object can be configured so as to divide a variable length parameter and then transmit the divided parameter using, for example, the CORBA-IIOP communication messages supported by the first ORB. With such a configuration, reliability of interconnection between products provided by different vendors can be improved.

On the other hand, this invention provides a server in a distributed system environment and comprising an ORB. This server comprises a generation unit for generating a profile object to disclose implementation specifications for the ORB, and a registration unit for registering the generated profile object in its memory, a naming server providing naming service, a Web server, a shared disk, or other servers.

Moreover, this invention provides a client in a distributed system environment which communicates with a server comprising an ORB. This client comprises an acquisition unit for acquiring a profile object indicating implementation specifications for the ORB server, a recognition unit for analyzing the acquired profile object and recognizing the implementation specifications for the ORB, and communication unit for performing inter-communication with the ORB according to the recognized implementation specifications for the ORB.

Moreover this invention provides a method for communication between objects, and a method for registering profile objects. In addition, this invention provides programs, which cause a computer to execute specified functions. These programs cause a computer to execute the function (process) of generating a profile object through functions supported by an ORB performing CORBA-IIOP communications, and the function (process) of registering the generated profile object, before CORBA-IIOP communications with another ORB.

Now, an embodiment of this invention will be described in detail in regard to the accompanying drawings.

FIG. 1 illustrates a client server system to which this embodiment is applied. In this system, a client 10, a server 30, and a naming server 50, which are computers in accordance with CORBA (Common Object Request Broker Architecture), are connected through a network 9, such as an Intranet. IIOP (Internet Inter-ORB Protocol) communications, the specifications for which are established by the CORBA, are performed between the client 10 and the server 30.

The IIOP is a common protocol established by the United States OMG (Object Management Group) to perform communications between ORBs (Object Request Brokers). In the CORBA, GIOP (General Inter-ORB Protocol) is established as an upper common protocol for communication protocols such as TCP/IP and OSI, to perform communication between different ORBs. The IIOP is established to perform communications using TCP/IP or other communication protocols according to the GIOP, and required to be implemented in all ORB products. Therefore, for the specified contents, interoperability between different ORB products provided by different vendors is provided. In addition, this IIOP enables connection to other typical distributed systems not conforming to CORBA. However, if a test for connection between products developed in accordance with CORBA is performed, the interconnection may fail because of different interpretations by vendors of CORBA specifications. With this embodiment, such a problem is solved.

In this embodiment, X Company ORB 11 provided by X Company is resident in the client 10, allowing the client 10 to read a method at a remote device. In the server 30, Y Company ORB 31 provided by Y Company, which is a different vendor from the X Company, is resident. In this embodiment, an object (Profile object) is defined, which allows the X Company ORB 11 in the client 10 to know CORBA support specifications for the Y Company ORB 31 responsible for IIOP connection in the server 30. With an implemented, instantiated, and disclosed profile object, the client 10 recognizes the ORB specifications for the server 30 before starting communications. Therefore, although a conventional ORB does not have the concept of a profile, in this embodiment, a concept of a profile object is implemented and disclosed, enabling partner devices for IIOP communications to be notified of the resident ORB functions.

As a most common service among CORBA common services, a naming service (NamingService) is provided. This naming service is a service for naming a CORBA object and enabling the object to be accessed using the name. Names are registered and referred in the naming server 50. CORBA products supplied by each company are provided with the naming service. In this embodiment, the Profile object, through support functions provided by Y Company ORB 31 in the server 30, is registered in advance, and then X Company ORB 11, operated by the client 10, accesses the Profile object through the naming server 50. The X Company ORB 11 grasps CORBA specifications for the Y Company ORB 31 in the server 30 through the Profile object. In this way, IIOP communication problems between the X Company ORB 11 and the Y Company ORB 31 are avoided, and the optimum IIOP communications employing the ORB functions in the server 30 are achieved.

FIG. 2 is a block diagram showing a configuration of the server 30. The server 30 includes: an ORB specifications recognition unit 21 for recognizing CORBA support specifications (ORB specifications) for the ORB (e.g., the X Company ORB 11) resident in the server 30; an ORB specifications storage unit 22 for storing information on the recognized CORBA support specifications; a specifications change determination unit 23 for determining whether any change is made from the ORB specifications stored in the ORB specifications storage unit 22 and ones newly recognized by the ORB specifications recognition unit 21; a Profile object generator 24 for generating a Profile object indicating ORB support functions of the server 30; and a Profile object transmitter 25 for transmitting the generated Profile object to the naming server 50.

FIG. 3 illustrates a flow chart of a Profile object registration process performed in the server 30. First, in the server 30, the ORB specifications recognition unit 21 recognizes specifications for the Y Company ORB 31 stored in the server 30. Then, the recognized specifications are compared with the ORB specifications stored in the ORB specifications storage unit 22. Specifically, the determination unit 23 determines whether the ORB specifications are changed, with a version upgrade, for example (Step 101). If the ORB specifications are not changed, the process is finished. If the ORB specifications are changed, connection is made to the naming server 50 (Step 102). Then, the Profile object generator 24 generates a Profile object (Step 103), and the Profile object transmitter 25 transmits the generated Profile object. Finally, the Profile object is registered in the naming server 50 (Step 104), and the Profile object registration process is completed.

FIG. 4 illustrates a flow chart of a Profile object acquisition process performed in the client 10. First, the X Company ORB 11 in the client 10 connects to the naming server 50 (Step 201), and acquires a Profile object through the naming service (Step 202). Then, the acquired Profile object is compared with the one acquired (Step 203) and determination is made whether any changes were made in ORB specifications (Step 204). If no changes were made, the process is finished. If changes were made, the Profile object of the Y Company ORB 31 stored in the client 10 is updated (Step 205), and the Profile object acquisition process is completed.

Now, an example of the processes shown in FIGS. 3 and 4 will be described.

When calling a method of a CORBA remote object, a parameter is specified. The client 10 usually has no means for knowing. Therefore, CORBA-IIOP communications may not be properly performed. However, according to this embodiment, the probability of normal operation will be improved with a configuration as will be described below.

In the Y Company ORB 31 provided in the server 30, the maximum data length of a variable length parameter (Interface Definition Language (IDL), e.g., String), which can be handled one at a time, is supposed to be 1 Mbyte. First, in the sever 30, a Profile object representing functions of the Y Company ORB 31 is represented as YprofObj. As methods of YprofObj, int getMaxStringData( ) and void setMaxStringData( ) are defined. In addition, YprofObj is implemented in the server 30 so that a return value of getMaxStringData( ) is 1 Mbyte. Then, an instance of YprofObj is generated and registration is made in the naming service (bind( )).

In the X Company ORB 11 in the client 10, the reference of YprofObj is acquired (resolve( )) through the naming service, and then the MAX value of 1 Mbyte in the String of Y Company ORB 31 is recognized. In addition, in the client 10, the object reference of the server 30 is acquired, and then a method of the server 30 is provided a String type parameter of 1.5 Mbytes. Since the X Company ORB 11 recognizes that the maximum value of String parameters of the Y Company ORB 31 is 1 Mbyte, the transmission is performed with the String parameter divided into parameters of 1 and 0.5 Mbytes using Fragment, which is a CORBA-IIOP communication message.

At this point, if the Y Company ORB 31 is changed and the MAX value of String is set to 2 Mbytes, divided transmission of a parameter of 1.5 Mbytes is stopped and changed to undivided transmission. In this way, efficient CORBA-IIOP communications making use of the characteristics of the server 30 can be achieved.

Moreover, if the Y Company ORB 31 is changed and the MAX value of String is set to be 0.5 Mbyte, a parameter of 1.5 Mbytes is transmitted as divided into three portions. In this way, even if connection problems would otherwise occur, appropriate interconnection can be achieved without problems by introducing such a mechanism.

Next, examples of the IIOP messages will be described.

In the latest CORBA specifications Version 2.3, eight types of messages are defined as CORBA-IIOP communication messages. However, current CORBA products provided by each company support Request and Reply, which are the most frequently employed, but they may not support the other six parameters (CancelRequest, LocateRequest, LocateReply, CloseConnection, MessageError, Fragment).

As a result, CORBA-IIOP communications may fail between products of different vendors. Therefore, defining a method through which IIOP messages supported by a vendor in a Profile object is likely to avoid such a problem.

In the server 30, the support situation of a IIOP message XXXX (IIOP message) of the Y Company ORB 31 is set and readable methods (e.g., void_setXXXXSupported(boolean), boolean_getXXXXSupported( )) are defined. As an example, if the Y Company ORB 31 does not support the Locate Request_in a Profile object, false(0) is implemented in the method of _setXXXXSupported( ).

FIG. 5 illustrates an exemplary process according to support situations for IIOP messages. As described above, the X Company ORB 11 in the client 10 acquires (resolve( )) the reference of YprofObj through the naming service in the naming server 50 (Step 301). Then, getLoceteRequestSupported( ) is called and determination is made whether the Y Company ORB 31 supports LocateRequest message (Step 302). If supported, LocateRequest is transmitted (Step 303) and the process is continued (Step 305). If not, Request is transmitted instead of the LocateRequest (Step 304). Therefore, LocateRequest from the client 10 can be replaced with Request message from the client 10. Subsequently, the process is continued (Step 305). The Y Company ORB 31 receives the Request, and then returns Reply+LocationForward, which is equivalent to LocateReply for LocateRequest to the X Company ORB 11. After that, the communication is continued. In this example, if a Profile object does not exist, connection is not available.

FIG. 6 illustrates an example of Profile objects generated in the server 30. In the Profile object shown in FIG. 6, ORB supports 1.0, 1.1, 1.2, and so on are described in struct giopversion{ }. For example, in the case of 1.2, major is 01 and minor is 02. In octet SupportedIIOPMessage, supported IIOP messages are described. Eight messages are defined in the CORBA; 0xFF means full-support and 0xF7 means that LocateRequest is not supported. In longlong MaxDataVolume;, the maximum data value which can be transmitted one at a time (e.g., 10,000,000 // 10 Mbyte) is described. In string ORBVendorName, an ORB vendor name (e.g., "IBM") is described. In addition, boolean InsSupport; is a flag indicating whether Interoperable Naming Service (INS) is supported or not, e.g., 1: supported and 0: not supported.

FIG. 7 illustrates another example of Profile objects. Ten "ObjectServiceContext" specifications for interconnection are defined in the CORBA. For example, "is_TransactionService" shown in FIG. 7 means whether "TransactionService" is supported or not, and other items can be understood in the same way. Profile objects can indicate ORB support functions by indicating whether these specifications are supported or not.

As described above, in CORBA, its specifications are defined as external ones. However, ORB implementation is not provided, so that various problems have occurred in practical tests due to different implementations in different CORBA products. As an example, when trying to transmit a large amount of data, such as binary data of 10 or 20 Mbytes, how much data is supported is not defined in the CORBA level. As a result, when trying to transmit data of 10 Mbytes at a time, it cannot be transmitted completely and the receiver cannot receive all of the data and problems may occur. Therefore, with a Profile object according to this embodiment, how much data can be received can be recognized in advance, so that overflow will not occur at a partner receiver by transmitting divided data from a sender.

Conventional CORBA products cannot manage version upgrades after connection. Therefore, if only GIOP 1.0 is supported in the server 30 and the client 10 supports GIOP 1.2 when the client 10 tries to connect to the server 30 with GIOP 1.2, connection problems may occur. According to this embodiment, if the Y Company ORB 31 in the server 30 is changed, the change can be disclosed to the X Company ORB 11 in the client 10 by changing the Profile object. As a result, connection problems can be minimized.

As described above, the conventional ORB does not provide the concept of a profile object. According to this embodiment of the present invention, the concept of a Profile object can improve reliability and communication efficiency for CORBA-IIOP interconnection between ORBs of different vendors. In addition, the Profile object can be adapted not only to the CORBA but also to different vendor environments of Enterprise Java Beans (EJB) using ORB. Moreover, in an environment where CORBA servers provided by plural vendors exist, by defining, implementing, and disclosing an object having the method returning the Profile object name for each vendor in different environments can be more flexibly addressed.

The usage examples of the CORBA naming service regarding location and calling method of a Profile object are described above. With other methods, a partner device can be notified of support functions. Specifically, other subsystems using File Transfer Protocol (FTP) and Hypertext Transfer Protocol (HTTP), for example, are available for recognizing support functions. For example, information on support functions of server 30 is provided on the Internet Web, and the client 10 accesses the Web to acquire the information on support functions using HTTP. In addition, the server 30 and the client 10 share a remote physical drive, and support functions may be acquired using NetBIOS through LAN.

FIG. 8 show an example where the information on ORB support functions is acquired by accessing a Web server with the HTTP through the Internet. In this embodiment, a Web server 70 is introduced, and the client 10 and the server 30 are connected to the Web server 70 through the Internet 80. In the Web server 70, a Profile object indicating specifications for the Y Company ORB 31 is stored in advance. Before performing IIOP intercommunications with the Y Company ORB 31 by the X Company ORB 11, the client 10 acquires a Profile object from the Web server 70 with HTTP to recognize specifications for the Y Company ORB 31. After recognizing the specifications, the client 10 perfornms IIOP intercommunications through a network 9. Reliable IIOP intercommunications (Interoperability) can be achieved as if a Profile object is acquired from the naming server 50. In this embodiment, the naming server shown at Steps 102 and 104 in FIG. 3, and Step 201 in FIG. 4 is replaced with a Web server.

FIG. 9 illustrates an example of sending and receiving a Profile object through a shared disk. In this embodiment, a local drive is provided, and the client 10 and server 30, in which each ORB resides, and a computer 90 are connected through a local area network (LAN) 91. The technique which allows a physical drive (e.g., C drive) provided on the computer 90 on the LAN 91 to be employed as a local drive (e.g., X drive), is called a shared disk. Usually, NetBIOS, a communication protocol between the LAN 91 and applications, is employed. In this embodiment, a Profile object can be sent and received between the server 30 and the client 10 through the shared disk. In this case, the naming server shown at Steps 102, 104 in FIG. 3 and Step 201 in FIG. 4 is replaced with the shared disk. Thus, the server 30 establishes connection to the shared disk, and then duplicates a generated Profile object to the shared disk. The client 10 establishes connection to the shared disk, and then acquires the Profile object from the shared disk to recognize specifications supported by the Y Company ORB 31 in the server 30. According to the recognized specifications, sending and receiving can be performed.

Each process described above is executed in computer equipment, such as the server 30 and the client 10, according to specified programs. These programs may be provided in a specified storage device, or from a program transmitting device. The storage media include CD-ROM, DVD, memory, and a hard disk, in which programs to be executed by computer are stored in such a manner so that the computer can read the programs from the storage devices. In addition, if the programs are installed through a network, such as the Internet, the programs are provided by a specified program transmitting device. In this case, the program transmitting device may be configured to comprise storage unit, such as CD-ROM, DVD, memory, and a hard disk having the programs stored therein, and transmitting means for reading the programs from the storage unit and transmitting them to an executing device through a connector or a network, such as the Internet and LAN.

As described above, according to this invention, reliability in interconnection in ORB communications between products having different specifications can be improved.

BRIEF DESCRIPTION OF THE DRAWINGS

FIG. 1 illustrates a client server system to which an embodiment of this invention is applied;

FIG. 2 is a block diagram showing a server configuration;

FIG. 3 is a flow chart showing the registration process of a Profile object executed in a server;

FIG. 4 is a flow chart showing the acquisition process of a Profile object executed in a client;

FIG. 5 shows a process example in a client according to support situations for IIOP messages;

FIG. 6 shows an example of Profile objects generated by a server;

FIG. 7 shows another example of Profile objects;

FIG. 8 shows a process example in which a Web server is accessed with HTTP through the Internet, and information on ORB support functions is acquired; and FIG. 9 shows an example of sending and receiving a Profile object through a shared disk.

The invention claimed is:

1. A system, including a first device comprising, a first Object Request Broker (ORB) and a second device comprising a second ORB, comprising:
   a generation unit for generating a profile object to disclose implementation specifications for directly communicating with the first ORB; and
   a naming service for associating a name with the profile object,
   wherein the second ORB is operable to use the name of the profile object to access the profile object through the naming service and directly communicate with the first ORB based on the implementation specifications disclosed by the profile object.

2. The system of claim 1, further comprising a registration unit for registering the profile object in a naming server which provides the naming service according to Common Request Broker Architecture (CORBA).

3. The system of claim 1, wherein the registration unit registers the profile object in a Web server or a shared disk.

4. The system of claim 1, wherein if specifications for the first ORB are changed, the generation unit generates a new profile object according to the changed specifications.

5. A system in a distributed system environment, comprising:
   a server comprising a first ORB;
   a client comprising a second ORB, wherein specifications for the second ORB are different from specifications for the first ORB; and
   a naming server which registers a profile object for disclosing the specifications for directly communicating with the first ORB through a naming service to the naming server, the naming service associating a name with the profile object,
   wherein the second ORB is operable to use the name of the profile object to access the profile object through the naming service of the naming server and directly communicate with the first ORB based on the specifications disclosed by the profile object.

6. The system of claim 5 wherein the server defines in the profile object a method describing a maximum data length of variable length parameters that can be handled at a time by the first ORB.

7. The system of claim 6, wherein the second ORB acquires the profile object through the naming server and recognizes the maximum data length and divides a parameter accordingly and transmits the divided parameter.

8. The system of claim 5, wherein the server defines a method in the profile object that discloses CORBA-Internet Inter-ORB Protocol (IIOP) communication messages supported by the first ORB.

9. The system of claim 8, wherein the second ORB acquires the profile object through the naming server and recognizes the CORBA-IIOP communication messages supported by the first ORB and performs transmission using the supported CORBA-IIOP communication messages.

10. A server in a distributed system, environment, comprising an ORB, comprising:
    a generation unit for generating a profile object to disclose implementation specifications for directly communicating with the ORB; and
    a naming server including a registration unit for registering the profile object generated by the generation unit through a naming service of the naming server, the naming service associating a name with the profile object generated by the generation unit and enabling a second ORB in the distributed system environment to use the name of the profile object to access the profile object to obtain the implementation specification for directly communicating with the ORB.

11. The server of claim 10, wherein the registration unit registers the profile object generated by the generation unit through a naming service of CORBA.

12. The server of claim 10 further comprising a specification change determination unit for determining whether specifications are changed in the ORB, wherein if the specifications are changed, the generation unit generates a new profile object according to the changed specification.

13. The server of claim 10, wherein the generation unit defines a method in the profile object as a command describing a maximum data length of variable length parameters operable to be handled at a time by the ORB.

14. The server of claim 10, wherein the generation unit defines a method in the profile object that discloses CORBA-IIOP communication messages supported by the ORB.

15. A client in a distributed system environment, wherein the client communicates with an ORB at a server, the client comprising:
    an acquisition unit for acquiring a profile object through a naming service, the acquisition unit using a name of the profile object to acquire the profile object through the naming service, the profile object describing implementation specifications for directly communicating the ORB in the server;
    a recognition unit for analyzing the profile object acquired by the acquisition unit and recognizing the implementation specifications for the ORB; and
    a communication unit for directly communicating with the ORB according to the implementation specifications for the ORB recognized by the recognition unit.

16. The client of claim 15 further comprising a storage unit for storing the profile object acquired by the acquisition unit, wherein the profile object stored by the storage unit is compared with a profile object newly acquired by the acquisition unit, and the profile object stored in the storage unit is updated if the implementation specifications of the ORB are changed.

17. A method for communication between a first ORB and a second ORB in a distributed system environment, the second ORB having specifications different from the first ORB, the method comprising
    generating a profile object comprising specifications for directly communicating with the first ORB;
    registering the profile object through a naming service, the naming service associating a name with the profile object;
    the second ORB using the name of the profile object to acquire the profile object registered with the naming service;
    the second ORB recognizing the specifications of the first ORB; and
    the second ORB directly communicating with the first ORB according to the recognized specifications of the first ORB.

18. Then method of claim 17, wherein the specifications of the first ORB is recognized from the profile object acquired through a naming service of CORBA.

19. The method of claim 17, wherein the specifications of the first ORB is recognized from the profile object acquired through a Web server.

20. The method of claim 17, wherein the specifications of the first ORB is recognized from the profile object acquired through a shared disk.

21. A method comprising:
    generating a profile object through functions supported by a first ORB capable of performing CORBA-IIOP communications, the profile object disclosing implementation specifications for directly communicating with the first ORB, and
    registering the profile object through a naming service prior to the first ORB communicating with other ORBs, the naming service associating a name with the profile object,
    wherein the other ORBs are operable to use the name of the profile object to access the profile object via the naming service and directly communicate with the first ORB based on the implementation specifications.

22. the method of claim 21, wherein the profile object is registered through a naming service of CORBA.

23. A computer readable medium with program instructions tangibly stored thereon, the computer readable medium comprising instructions for:

generating a profile object through functions supported by a first ORB capable of performing CORBA-IIOP communications, the profile object disclosing implementation specifications for directly communicating with the first ORB; and registering the profile object through a naming service prior to the first ORB communicating with other ORBs, the naming service associating a name with the profile object, wherein the other ORBs are operable to use the name of the profile object to access the profile object via the naming service and directly communicate with the first ORB based on the implementation specifications.

24. A computer readable medium with program instructions tangibly stored thereon for communication between a first ORB and a second ORB in a distributed system environment, the second ORB having specifications different from the first ORB, the computer readable medium comprising instructions for:

generating a profile object comprising specifications for directly communicating with the first ORB;

registering the profile object through a naming service, the naming service associating a name with the profile object;

the second ORB using the name of the profile object to acquire the profile object registered, with the naming service;

the second ORB recognizing the specifications of the first ORB; and the second ORB directly communicating with the first ORB according to the recognized specifications of the first ORB.

25. The computer readable medium of claim 24, wherein the specifications of the first ORB is recognized from the profile object acquired through a naming service of CORBA.

26. The computer readable medium of claim 24, wherein the specifications of the first ORB is recognized from the profile object acquired through a Web server.

27. The computer readable medium of claim 24, wherein the specifications of the first ORB is recognized from the profile object acquired though a shared disk.

* * * * *